(12) United States Patent
Menguy et al.

(10) Patent No.: US 10,997,264 B2
(45) Date of Patent: May 4, 2021

(54) DELIVERY OF CONTEXTUAL INTEREST FROM INTERACTION INFORMATION

(71) Applicant: Adobe Inc., San Jose, CA (US)

(72) Inventors: Charles Menguy, New York, NY (US); Sudhakar Pandey, Noida (IN); Roshan Singh, Greater Noida West (IN); Ravi Prakash Singh, Noida (IN); David Meier Weinstein, Rockville Centre, NY (US); Ankush Sharma, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/107,769

(22) Filed: Aug. 21, 2018

(65) Prior Publication Data
US 2020/0065425 A1 Feb. 27, 2020

(51) Int. Cl.
| | | |
|---|---|---|
| *G06F 17/20* | (2006.01) | |
| *G06F 16/957* | (2019.01) | |
| *H04L 29/08* | (2006.01) | |
| *G06F 16/31* | (2019.01) | |
| *G06F 16/9535* | (2019.01) | |
| *G06F 16/955* | (2019.01) | |

(52) U.S. Cl.
CPC ........ *G06F 16/9577* (2019.01); *G06F 16/313* (2019.01); *G06F 16/9535* (2019.01); *G06F 16/9566* (2019.01); *H04L 67/22* (2013.01)

(58) Field of Classification Search
CPC .............. G06F 16/9577; G06F 16/313; G06F 16/9535; G06F 16/9566; H04L 67/22; G06Q 30/0251; G06Q 30/0631; G06Q 30/02
See application file for complete search history.

(56) References Cited

U.S. PATENT DOCUMENTS

| | | | | |
|---|---|---|---|---|
| 2012/0245996 | A1* | 9/2012 | Mendez | G06Q 30/0241 705/14.49 |
| 2013/0024507 | A1* | 1/2013 | Lifshits | G06Q 50/01 709/204 |
| 2014/0025497 | A1* | 1/2014 | Jha | G06Q 30/02 705/14.54 |
| 2014/0189525 | A1* | 7/2014 | Trevisiol | G06F 16/35 715/745 |
| 2015/0278915 | A1* | 10/2015 | Dedhia | G06F 16/9535 705/26.7 |

(Continued)

*Primary Examiner* — Keith D Bloomquist
(74) *Attorney, Agent, or Firm* — FIG. 1 Patents

(57) ABSTRACT

Systems and techniques for delivery of contextual interest from interaction information are described that process user interactions with digital content to generate user interest scores for various topics. A contextual user interest system uses user interaction data to identify and contextualize content, and assigns propensity scores to the contextualized content. By dynamically contextualizing pages of content, the contextual user interest system may adapt to changes in the content and provide more accurate and robust information over time, which is not possible using conventional techniques. The contextualized pages of content are used to assign user interest scores across a number of topics to users who have visited the pages of content, and the user interest scores are normalized in a manner that allows a user's degree of interest in a topic to be compared to that of another user.

20 Claims, 11 Drawing Sheets

(56) References Cited

U.S. PATENT DOCUMENTS

| | | | |
|---|---|---|---|
| 2016/0070731 A1* | 3/2016 | Chang | G06F 16/958 707/741 |
| 2016/0191447 A1* | 6/2016 | Firat | H04L 51/32 709/204 |
| 2017/0155726 A1* | 6/2017 | Green | G06Q 50/01 |
| 2018/0018316 A1* | 1/2018 | Bogdan | G06F 16/355 |

* cited by examiner

700

DELIVERY OF CONTEXTUAL INTEREST FROM INTERACTION INFORMATION

BACKGROUND

Recommendation systems may be used to guide user interaction and navigation with digital content via a computing device. Examples include forming recommendations regarding which article to read by a user, which advertisement to include in a webpage, digital movies for viewing, and so forth. To do so, recommendation systems may utilize user interest information formed from user interaction with digital content. Content-based filtering recommendation systems (e.g., systems based upon a TF-IDF representation, a naive Bayes classifier, and so forth) utilize a description of an item in conjunction with a profile of a particular user's interests. A user profile indicates what types of items a user is interested in, and candidate items categorized with keywords are compared to the user profile to identify and recommend items that match the user's preferences.

A page of a website, for instance, may be manually tagged with information that represents the content or context of the particular page. When a user visits the page, this information is then associated with the user to represent that the user is interested in those tags. However, manually tagging the content of every page of a website is hard to maintain for large websites, websites with dynamic content, and so forth. Further, the majority of contextual data is not collected from the page, as manual tags typically contain only a small set of arbitrarily decided topics.

Additionally, recommendation systems have a limited view of a particular user due to a small number of touchpoints that may be obtained regarding the user, e.g., that may occur within a particular website. A touchpoint can be any interaction with the user, such as viewing an ad, visiting a website, purchasing a good or service, and so forth. Although each touchpoint with a user can contain useful information, a particular website typically can only track touchpoints that occur within the particular website itself. Further, tags and data obtained from user touchpoints are not typically shared between recommendation systems, e.g., from different websites. As a result, conventional techniques are implemented as "walled garden" systems. This limits performance of the conventional techniques in that the amount of context and number of touchpoints is limited and thus limits the accuracy of recommendation or digital marketing systems over time, thereby resulting in inefficient use of computing resources and thus inefficient operation of a computing device that implements conventional recommendation systems.

SUMMARY

Systems and techniques for delivery of contextual user interest from interaction information are described that process user interactions with digital content to generate user interest scores for various topics. These techniques overcome the limitations of conventional recommendation systems that are limited to touchpoints within a particular service provider and thus do not fully exploit available data, and that do not tie topics of interest with weights that reflect user sentiment with respect to the topics of interest and thus provide inaccurate results. To do so, a contextual user interest system employs user interaction data to identify content that may be contextualized, and assigns propensity scores to the contextualized content. This may include contextualizing content that is not hosted by service provider systems associated with the contextual user interest system. This is performed by crawling content and tokenizing the results, weighting the tokens, and extracting a number of top entities.

By dynamically contextualizing pages of content, the contextual user interest system may adapt to changes in the content and provide information with increased accuracy and robustness over time, which is not possible using conventional techniques. The contextualized pages of content may be used to assign user interest scores across a number of topics to users who have visited the pages, and the user interest scores are normalized in a manner that allows a user's degree of interest in a topic to be compared to that of another user. The user interest scores may be utilized in a variety of ways, such as to identify an audience with particular interests or to perform content analysis upon a service provider to determine categorical content density in comparison to categorical user interest.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
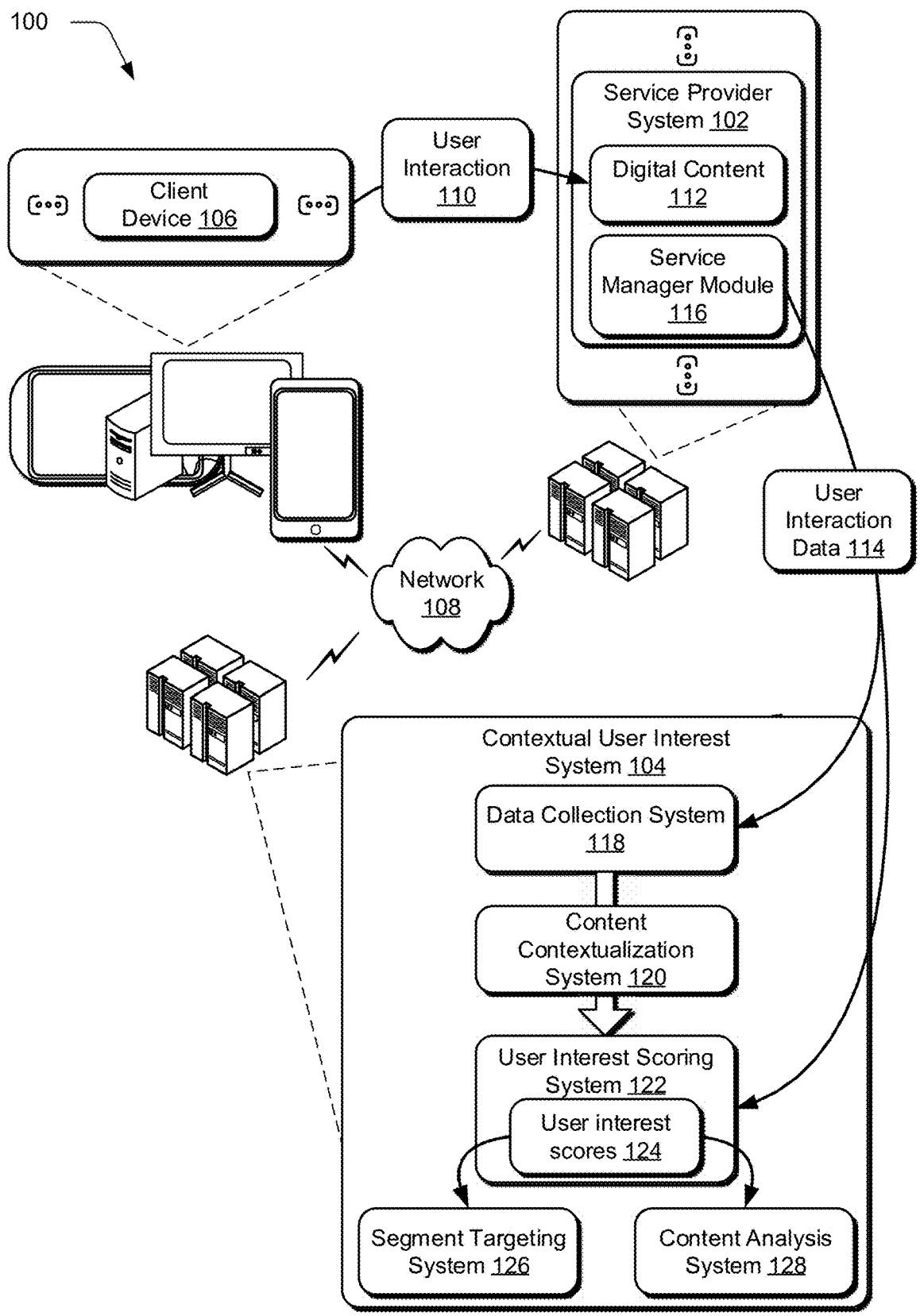
FIG. 1 is an illustration of an environment in an example implementation that is operable to employ recommendation system techniques described herein.

In conventional recommendation systems, a page of a website is manually tagged with information representing the content of the page. When a user visits the page, the user is assumed interested in each of the tags. However, this limits performance of the conventional recommendation systems as the determination of user interest is limited to access to the manual tags and does not account for a user's sentiment with respect to the topics identified by the tags.

Accordingly, techniques are described in which a contextual user interest system dynamically contextualizes content and generates user interest scores with weights connoting a degree of user sentiment. To do so, the contextual user interest system uses available user interaction data to identify content (e.g., content associated with identified touchpoints from a user) that may be contextualized, and assigns propensity scores to the contextualized content. Some touchpoints may reference content that is not hosted by service providers associated with the contextual user interest system (i.e. referrer URLs), and thus techniques are described that are capable of contextualizing content from any host or with varying degrees of access.

To begin, information associated with content is extracted by crawling the content (e.g., webpages). The information is contextualized by tokenizing the information into individual words and weighting the tokens such as based on inverse document frequencies, named entities, and parts of speech. Tokenizing content generates a list of standardized and significant keywords. In implementations, tokenizing content includes decompounding words into individual constituent words (e.g., decompounding 'they're' into 'they' and 'are'), removing stop-words that do not have significance as keywords (e.g., 'a', 'the', 'we'), and stemming words into respective singular root forms (e.g., 'runs' and 'running' into 'run'). In this way, the content is reduced to a set of tokens based on meaning and significance.

Weighting the tokens is based on applying an inverse document frequency to generate a normalized frequency of each token within the content, and may further include increasing weights for identified named entities and adjusting weights according to a relative importance of a part of speech for each word (e.g., by considering a noun to be more important than a preposition). The weights additionally reflect user sentiment, such as through weights with positive or negative values. Rather than merely extracting a topic from a page, the contextual user interest system described herein captures user sentiment toward the topic and adjusts the weight for the topic according to the sentiment. Weights reflecting sentiment may be leveraged, for instance, to avoid making 'insensitive' recommendations that conventional systems are susceptible to (e.g., recommending an alcoholic beverage to someone who reads articles pertaining to alcoholism or drunk driving).

By dynamically contextualizing pages of content, the contextual user interest system may adapt to changes in the content and provide accurate and robust information, which is not possible using conventional techniques. The contextualized pages of content are used to assign user interest scores across a number of topics to users who have visited the pages of content, and the user interest scores are normalized in a manner that allows a user's degree of interest in a topic to be compared to that of another user. In order to determine a user's interest, it is first identified from the user interaction data (e.g., touchpoints) what content has been visited by the user. The weights of entities associated with each item of content (e.g., webpage) visited by the user are summed in an ongoing, dynamic manner to provide increasingly accurate results over time. For a particular moment in time, the summed weights are normalized by using a propensity function to provide a user interest score on a scale consistent from one user to another.

The user interest scores may be utilized in a variety of ways, such as to identify an audience with particular interests, to perform content analysis upon a service provider to determine categorical content density in comparison to categorical user interest, and so forth. In a first example application that identifies an audience with particular interests, a user may specify a number of traits along with a propensity score for each of the specified traits. These specified traits and propensity scores are compared against the user interest scores to identify a segment of users with interests that meet or exceed the specified propensities. A second example application determines categorical content density in comparison to categorical user interest involves contextualizing content associated with a particular content provider and mapping the contextualized content to a category hierarchy. User interest scores for users of the particular content provider are aggregated and mapped to the category hierarchy. The mapped contextualized content and the mapped interest scores are normalized and overlaid such that for each item within the category hierarchy it is conveyed how much content of the particular content provider corresponds to the item in comparison to how much the user base of the particular content provider is interested in the item.

In this way, content is dynamically contextualized in a manner that allows a service provider to extract user interests from outside content and provides a framework to allow discrete service providers to operate in conjunction with one another and pool contextual data together to build a robust contextual user profile across disparate websites. As a result, digital marketing systems utilizing the contextual user interest system described herein are provided with more accurate and dynamic user interests and thus improving operational efficiency of a computing device that employs these techniques.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ contextual user interest techniques described herein. The illustrated environment 100 includes a service provider system 102, a contextual user interest system 104, and a plurality of client devices, an example of which is illustrated as client device 106. These devices are communicatively coupled, one to another, via a network 108 and may be implemented by a computing device that may assume a wide variety of configurations.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the service provider system 102 and the contextual user interest system 104 and as further described in FIG. 11.

The client device 106 is illustrated as engaging in user interaction 110 with the service provider system 102. The service provider system 102, for instance, may be configured to support user interaction with digital content 112. User interaction data 114 is then generated (e.g., by a service manager module 116) that describes the user interaction 110. The service manager module 116 may be a plug-in module for communication with the contextual user interest system 104, such as a JavaScript extension that can be deployed on a webpage, and in some implementations is included as a part of the digital content 112. The digital content 112 may be any type of data that is configured to be rendered for output by an output device of a computing device to a user. Examples of the digital content 112 include digital images, digital audio, digital media, digital video, digital articles, digital text, and so forth.

The digital content 112 may take a variety of forms and thus the user interaction 110 with the digital content 112 may also take a variety of forms. For example, a user of the client device 106 interacting with the digital content 112 may read an article, view a digital video, listen to digital music, view posts and messages on a social network system, and so forth. In another example, the digital content 112 is configured as digital marketing content to cause conversion of a good or service, e.g., by "clicking" an ad, purchase of the good or service, and so forth. Digital marketing content may also take a variety of forms, such as electronic messages, email, banner ads, posts, and so forth. Accordingly, digital marketing content is typically employed to raise awareness and conversion of the good or service corresponding to the content. In another example, the user interaction 110 and thus generation of the user interaction data 114 may also occur locally on the client device 106.

The user interaction data 114 is received by a data collection system 118 of the contextual user interest system 104. The user interaction data 114 may reference content outside of the particular service provider system 102, such as a reference to digital content hosted by a different service provider system than the service provider system 102 that generates the user interaction data 114. As an example, the service provider system 102 may be providing the digital content 112 in the form of a website. When a user visits the website, the service provider system 102 collects referral information indicating an origin of the user such as through a referrer URL. Although the service provider system 102 cannot directly detect user interaction 110 with the referring website hosted by a different service provider system, the referrer URL may nonetheless provide valuable contextual information for the user and is included in the user interaction data 114. The data collection system 118 may then crawl the web site referenced by the referrer URL to generate contextual information to be associated with the user of the client device 106. The user interaction data 114 and the contextual information generated by the data collection system 118 are used by a user interest scoring system 122 to determine user interest scores 124.

The user interest scores 124 may be used such as to control output of the digital content 112 to the client device 106 based on a user of the client device 106. To do so, a segment targeting system 126 uses the user interest scores 124 to identify users with traits corresponding to particular items of the digital content 112, and may for instance generate a recommendation configured to control which items of the digital content 112 are output to the client device 106, e.g., directly via the network 108 or indirectly via the service provider system 102. The recommendation, for instance, may be configured to specify which article of digital content 112 is to be transmitted to the client device 106 via the service provider system 102. In another example, the recommendation identifies which item of digital marketing content is to be served as part of a webpage. In a further example, the segment targeting system 126 forms the item of digital content 112 itself, such as a recommendation for digital videos that is selectable to cause output of those videos. Thus, although the digital content 112 is illustrated as maintained by the service provider system 102, this content may also be maintained and managed by the contextual user interest system 104, the client device 106, and so forth.

Further, the user interest scores 124 may be used to guide generation or presentation of the digital content 112. To do so, a content analysis system 128 of the contextual user interest system 104 uses the user interest scores 124 to identify similarities or trends among user interests of users of the service provider system 102. The content analysis system 128 contextualizes the digital content 112 provided by the service provider system 102, and identifies portions of the digital content 112 based on an amount of alignment with the interests of the user base of the service provider system 102 based on the user interest scores 124. This information may be utilized by curators of the service provider system 102 to reorganize the digital content 112 to emphasize portions aligning with the interests of the user base, identify topics for future content creation, remove portions of the digital content 112 that do not correspond to the interests of the user base, and so forth.

The systems and techniques described herein provide a number of advantages over conventional techniques. For instance, conventional techniques fail to handle dynamic pages, where the content or context of the page changes each time the page is edited. In contrast, the contextual user interest system 104 utilizes caching with timeouts to crawl pages again after a timeout is met, periodically updating the contextual weights assigned to the particular page and adapting to changes made to the content. Further, conventional techniques are only capable of extracting topics of a page. In contrast, the contextual user interest system 104 ties topics with weights of positive or negative values to reflect user sentiment, and can avoid making 'insensitive' recommendations that conventional systems are susceptible to (e.g., recommending an alcoholic beverage to someone who reads articles pertaining to alcoholism or drunk driving). Additionally, the contextual user interest system 104 may be implemented as a cooperative model that allows service providers to target visitors who have never visited or used their services. By utilizing automated contextualization techniques, the content from multiple discrete service providers can be easily and consistently contextualized, fostering an environment that allows different service providers to operate in conjunction with one another and pool contextual data together to build a contextual user profile across disparate websites and create more robust user profiles.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
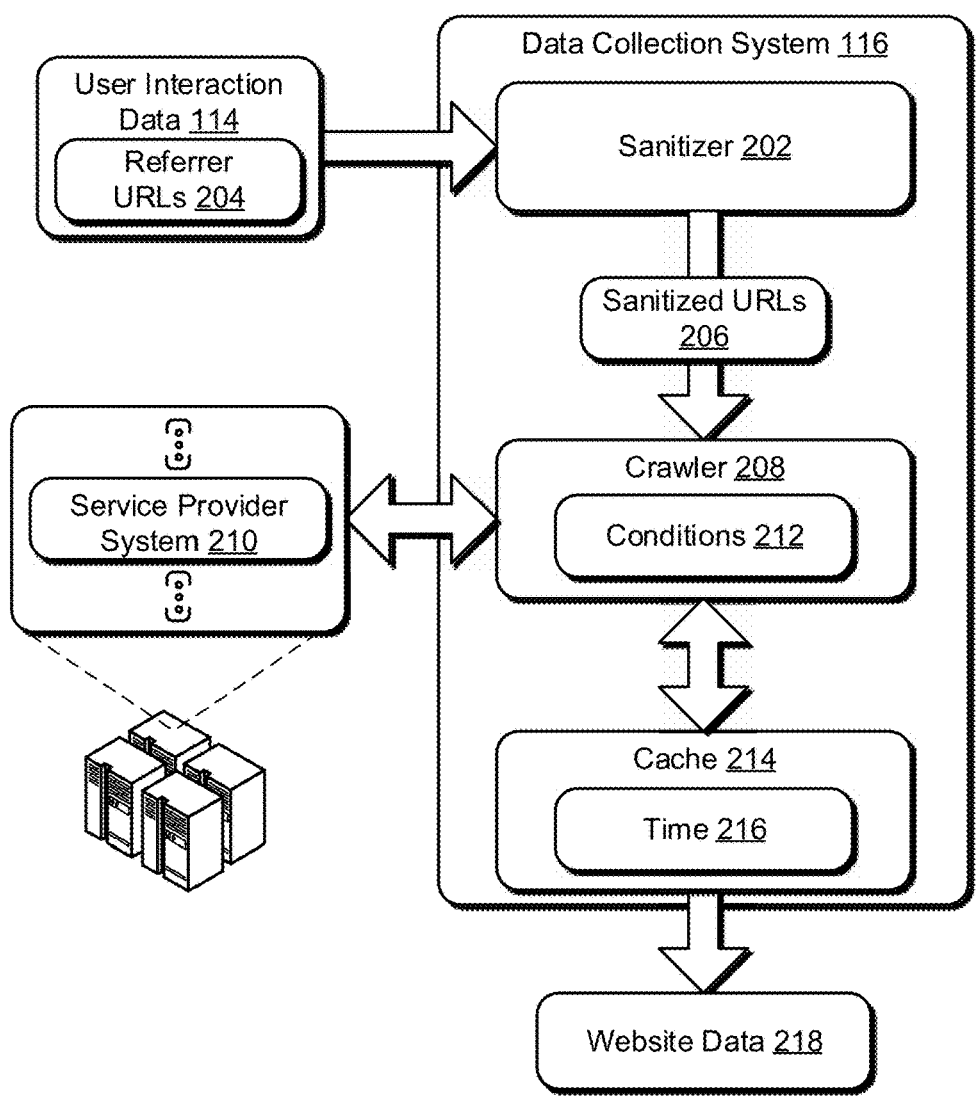
FIG. 2 depicts a system in an example implementation showing operation of an example data collection system for generating website data.

FIG. 2 depicts a system 200 showing an example data collection processing pipeline of the data collection system 118 of FIG. 1 in greater detail to generate website data for use by the user interest scoring system 122. The data collection processing pipeline begins by processing the user interaction data 114 with a sanitizer 202. The user interaction data 114 may include data provided by a single service provider system 102, or a plurality of different service provider systems 102. The user interaction data 114 includes referrer URLs 204. The referrer URLs 204 may be strings that include unnecessary information, resulting in multiple different ones of the referrer URLs 204 pointing to the same content.

To increase the efficiency of the data collection system 118 and reduce the computational costs associated with the system 200, the referrer URLs 204 are first sanitized by the sanitizer 202 so that URLs pointing to the same content are standardized to a single URL. The sanitizer 202 may remove irrelevant query parameters (such as domain-specific keys, UTM parameters, and so forth), may reorder soft query parameters to follow a consistent order or scheme, may include whitelisting or blacklisting particular keys or values, and so forth. Next, the sanitizer 202 may remove fragments such as pointers to specific portions within a page, where the fragment does not affect the overall content of the page itself. The sanitizer 202 converts the scheme and host of the referrer URLs 204 to a uniform case, such as by converting all characters in the referrer URLs 204 to lower case. Additionally, the sanitizer 202 may limit the inclusion of data based on domain, such as by blacklisting certain domains that do not provide relevant contextual information. For instance, if a referrer URL points to an advertising redirect URL, the advertising redirect URL does not provide any context relevant to the user and should not be included. Accordingly, the sanitizer 202 produces a number of sanitized URLs 206. In some implementations, the sanitizer 202 is included as a part of the service manager module 116 on the service provider system 102, such that the user interaction data 114 received by the data collection system 118 directly includes the sanitized URLs 206.

The sanitized URLs 206 are received by a crawler 208. The crawler 208 crawls websites associated with the sanitized URLs 206, for instance by accessing the websites from service provider systems 210. The service provider systems 210 may include service provider systems that differ from the service provider system 102, and the service provider systems 210 need not include the service manager module 116 of FIG. 1.

The crawler 208 may operate as an offline process, e.g., operate according to conditions 212. For instance, the conditions 212 may include a time constraint such that the same URL is not crawled more frequently than a specified duration, a condition that URLs are crawled at fixed time intervals, a condition that URLs should be crawled at least once per specified period, and so forth. To satisfy the conditions 212, the crawler 208 may communicate with a cache 214. For instance, the cache 214 may include data describing a time 216 that a URL was last accessed by the crawler 208. Upon retrieving a time 216 from the cache 214 that indicates that the crawler 208 may access the URL while satisfying the conditions 212, the crawler 208 may crawl the corresponding content of the service provider system 210 to generate website data 218 and update the cache 214 to reflect a new time 216 associated with the accessed URL.

Figure 3:
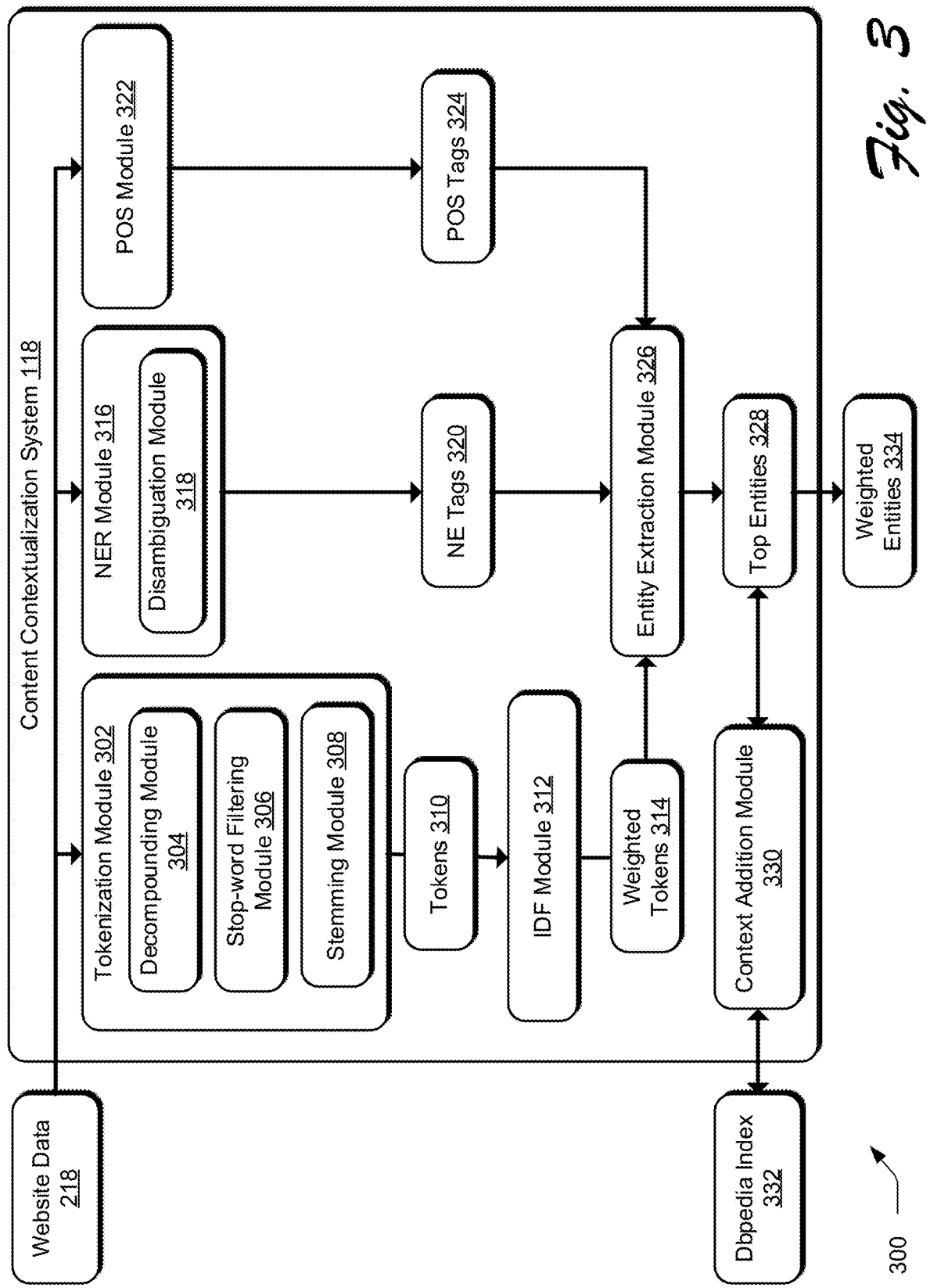
FIG. 3 depicts a system in an example implementation showing operation of an example content contextualization system for generating weighted entities.

FIG. 3 depicts a system 300 showing an example content contextualization processing pipeline of the content contextualization system 120 of FIG. 1 in greater detail to generate weighted entities for use by the user interest scoring system 122. The content contextualization processing pipeline begins by a tokenization module 302 performing tokenization on the website data 218 from the data collection system 118. The tokenization module 302 first processes the website data 218 to break text into a list of individual words or tokens.

The words are decompounded with a decompounding module 304 to break compound words into individual constituent words. Stop-words that do not have significance as a keyword (e.g., 'a', 'an', 'the', 'we', 'they', and so forth) are removed from the list of tokens by a stop-word filtering module 306. The words are further processed by a stemming module 308. The stemming module 308 converts words into a singular base or root form to help group words with similar meaning and allow aggregation of their frequencies, such as by consolidating related stemwords into a single token. Examples include stemming the word "running" into the word "run", the word "inaugurated" into the word "inaugurate", the word "trees" into the word "tree", and so forth.

The tokenization module 302 produces a list of tokens 310 that are further processed by an Inverse Document Frequency (IDF) module 312. The IDF module 312 includes a dictionary having all popular words for a language along with a score. The score describes how common a particular word is within the language, such that a commonly used word has a low IDF score while an infrequently used word has a high IDF score. For example, the word 'good' in English has a lower IDF score while the word 'genius' in English has a higher IDF score. The IDF module 312 performs a statistical analysis on the website data 218 to determine a frequency for each particular token 310 within the website data 218. The tokens 310 are processed by the IDF module 312 by multiplying an IDF score associated with a particular token 310 by the frequency of the particular token 310 within the website data 218. This produces weighted tokens 314 that represent a normalized weight for each respective token according to the frequency of the respective token within the website data 218 as compared to the frequency of the respective token within the language.

The website data 218 is further processed by a Named Entity Recognition (NER) module 316. The NER module 316 analyzes the text of the website data 218 to identify named entities such as persons, companies, organizations, places, and so forth. This includes utilizing a disambiguation module 318 to resolve various references of named entities. For instance, at the beginning of a paragraph, a person is typically referred to with a full name (e.g., first name and last name) while in the rest of the text the person is referred to only by one of the first name or the last name. The disambiguation module 318 resolves these various references to the same named entity and maps each of the various references to the full name. The disambiguation module 318 further disambiguates terms such as named entities that incorporate a word that may have a separate meaning. For example, the website data 218 may include the term "Adobe". The disambiguation module 318 resolves whether the term "Adobe" refers to the software company "Adobe System Incorporated" or to the building material "Adobe" made from earth and organic materials. Once named entities have been recognized within the website data 218, the NER module 316 stores the recognized entities as named entity (NE) tags 320. The website data 218 is additionally processed by a Part of Speech (POS) Module 322. The POS module 322 identifies a part of speech (e.g., a noun, verb, adjective, preposition, etc.) for each word within the website data 218, and stores the identified part of speech for each word as POS tags 324. The POS tags 324 may be helpful in determining importance of words, such as by considering a noun more important than a preposition, and so forth.

Once the weighted tokens 314, NE tags 320, and POS tags 324 have been created by the IDF module 312, the NER module 316, and the POS module 322, respectively, an entity extraction module 326 processes the weighted tokens 314, the NE tags 320, and the POS tags 324 to extract a number of top entities 328. This may involve, for instance, creating multi-word tokens like "machine learning" or "Adobe Photoshop" based on grammar rules in light of the NE tags 320 and the POS tags 324. The weighted tokens 314 are adjusted to increase the weights for named entities identified by the NE tags 320, as named entities are often considered more important keywords than other words. Further, the weighted tokens 314 are adjusted according to the POS tags 324 such as to prioritize proper nouns, then nouns, then verbs, and so forth. The number of the weighted tokens 314 that are extracted as the top entities 328 by the entity extraction module 326 may be any arbitrary number, such as 10 or 15 top entities. Reducing the potentially vast number of the weighted tokens 314 to a smaller number of the top weighted entities 328 reduces the computational and storage requirements of the content contextualization system 120 and the user interest scoring system 122 while retaining a reasonable amount of contextual information.

In cases where the content contextualization system 120 lacks sufficient information regarding a particular entity from the top entities 328 (such as in the case of a named entity), the content contextualization system 120 may utilize a context addition module 330 to query a dbpedia index 332. The dbpedia index 332 may be, for instance, a lucene index created from an opensource dbpedia dump of Wikipedia information. As an example, if one of the top entities 328 is "Kim Kardashian", the context addition module 330 searches the dbpedia index 332 for "Kim Kardashian" to identify additional attributes or keywords such as "television personality", "actress", "American", etc. These additional keywords may be added to the top entities 328, and a finalized set of the top entities 328 is output as weighted entities 334. The weighted entities 334 include each of the top entities 328, including the corresponding weights representative of a normalized frequency for each of the entities 334 within the website data 218 as adjusted for named entities and parts of speech as described above.

Figure 4:
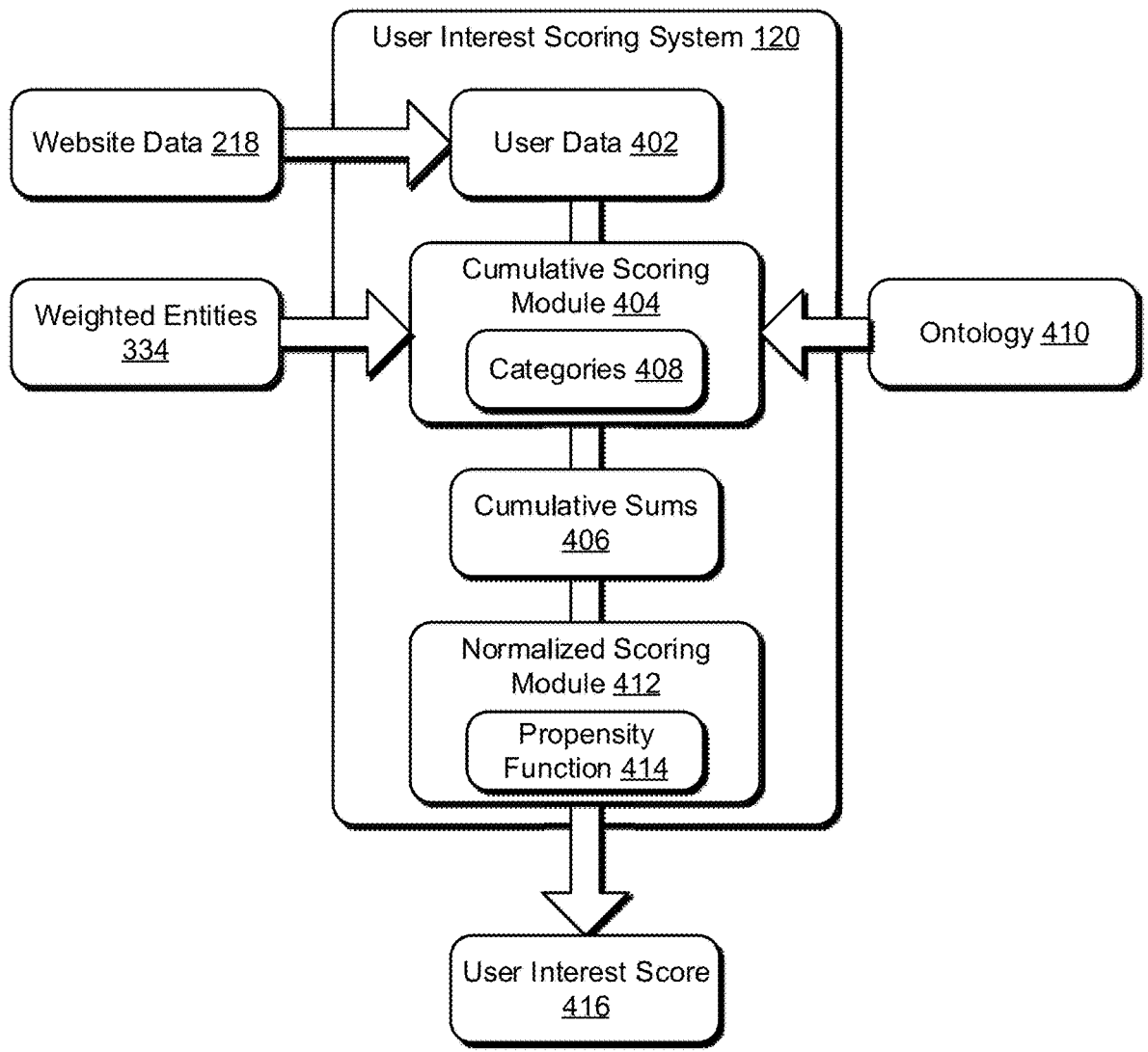
FIG. 4 depicts a system in an example implementation showing operation of an example user interest scoring system for generating user interest scores.

FIG. 4 depicts a system 400 showing an example interest scoring processing pipeline of the user interest scoring system 122 of FIG. 1 in greater detail to generate the user interest scores 124 for use by the segment targeting system 126 and/or the content analysis system 128. The interest scoring processing pipeline begins by extracting user data 402 for a particular user from the website data 218. For instance, the user data 402 may include a list of sanitized URLs that were visited by the particular user along with an identification for the particular user (e.g., an IP address associated with the particular user, an account identifier associated with the particular user, and so forth). The weighted entities 334 for each particular URL are received from the content contextualization system 120, and a cumulative scoring module 404 tracks a cumulative sum 406 of all of the weights for URLs associated with the particular user.

In some implementations, the weighted entities 334 are condensed into categories 408 extracted from an ontology 410. For example, an entity 334 may be "Roger Federer", and the ontology 410 may associate "Roger Federer" with any number of categories 408, such as "Sports", "Ball Games", "Tennis", and so forth. In this example, a score associated with the entity Roger Federer is additionally or alternatively counted as a score for one or more of the categories Sports, Ball Games, or Tennis. In this way, the cumulative scoring module 404 may be configured to track the cumulative sums 406 of weights according to the categories 408 with a particular level of specificity according to the ontology 410.

In order to determine a user's interests in a manner that may be compared from one user to another, the cumulative sum 406 from the cumulative scoring module 404 is processed by a normalized scoring module 412. The normalized scoring module 412 uses a propensity function 414 to determine a normalized user interest score 416. In one example, the propensity function 414 is given as:

$$P_i = \frac{1}{1 + e^{-\sum_{i,j} S_{i,j}}}$$

where $P_i$ is the propensity score for a given user for topic i, and $S_{i,j}$ is the score for topic i at interaction j. This example propensity function 414 gives a normalized score between 0 and 1 for each topic, with asymptotes at 0 and 1 to account for cases where there are lots of interactions on the same topic for a given user. If there are only positive interactions, the score will be between 0.5 and 1. If there are only negative interactions, the score will be between 0 and 0.5. For any mix of positive and negative interactions, the score will vary between 0 and 1 based on how strong the interactions were. In this manner, a user's interests are tracked as the user interest score 416 that indicates not only what topics a user is interested or not interested in, but also a normalized indication of degree as to how much the user likes or dislikes each topic. The user interest scores 416 may be stored, for instance, in a storage device within the contextual user interest system 104 such that each user is associated with a number of the categories 408 each having a propensity score for the respective user.

Figure 5:
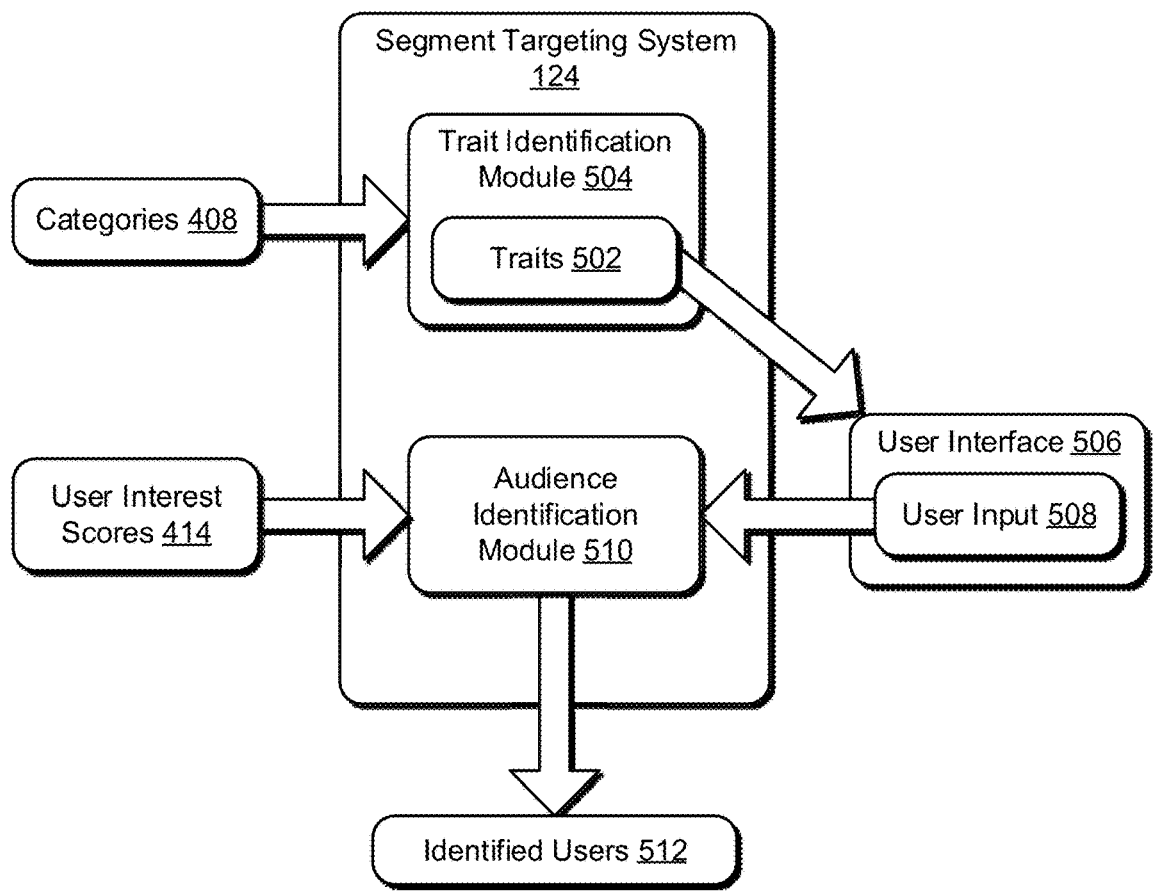
FIG. 5 depicts a system in an example implementation showing operation of an example segment targeting system for identification of users based on specified traits.

FIG. 5 depicts a system 500 showing an example segment targeting processing pipeline of the segment targeting system 126 of FIG. 1 in greater detail to identify a segment of users based on specified traits. The segment targeting processing pipeline begins by identifying traits 502 by processing the categories 408 with a trait identification module 504. The traits 502 may correspond to ones of the categories 408, may be broader or narrower than the categories 408, may include various combinations of the categories 408, and so forth. A trait may be a combination of units of information, and may include qualification requirements based on the units. As an example, a "high end camera browser" trait may be created to describe users associated with information pertaining to high end cameras, and the trait may be defined for instance using Boolean expressions or comparison operators as "product=camera AND price>1000".

The traits 502 are displayed in a user interface 506, such as a user interface of the client device 106. A user interacts with the user interface 506 to select one or more of the traits 502 as part of a user input 508. The user may select the traits according to a desire or need to locate a segment of users that have interests corresponding to the selected traits.

Figure 6:
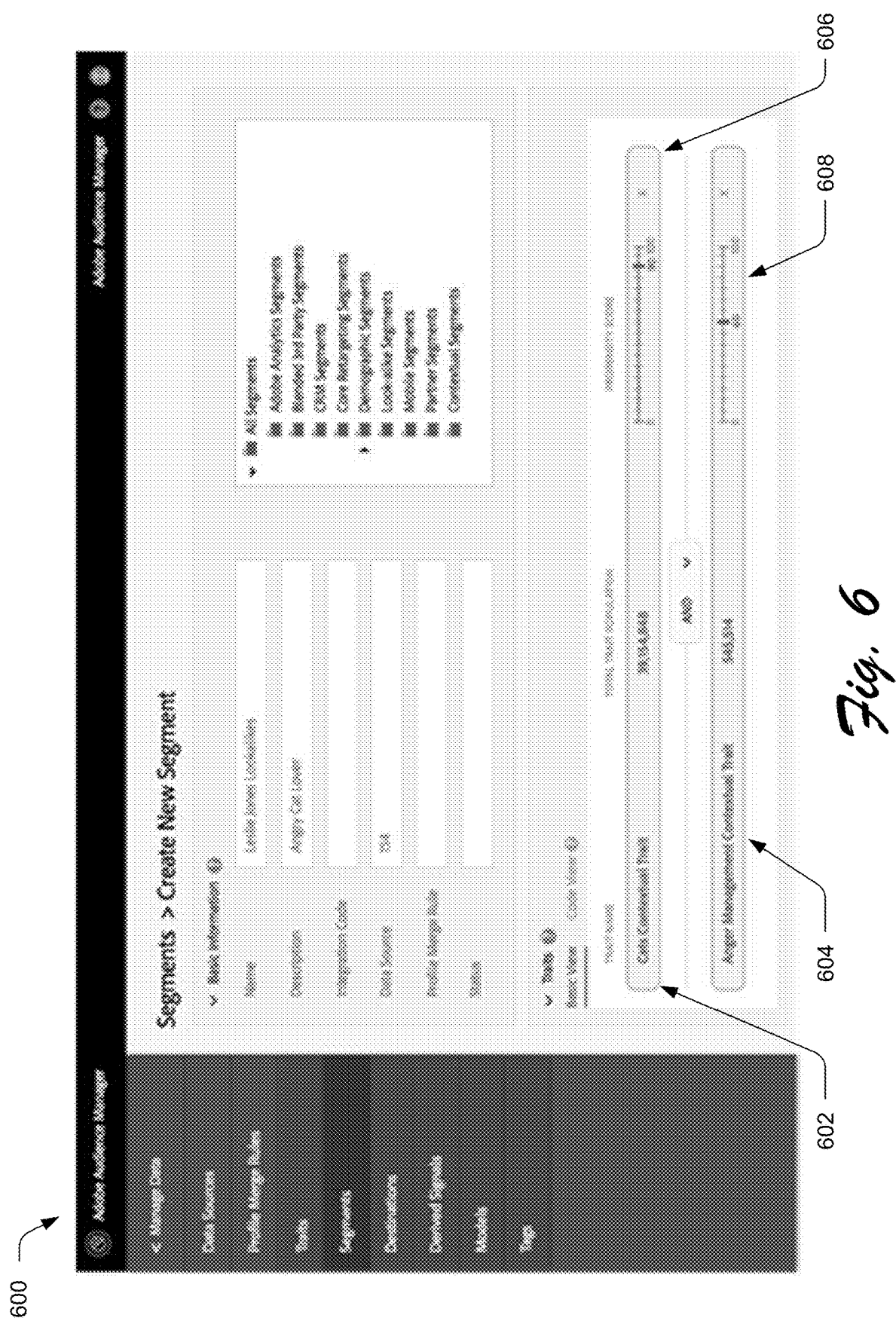
FIG. 6 depicts an example graphical user interface for creation of user inputs used in conjunction with a segment targeting system.

FIG. 6 depicts an example graphical user interface 600 for use in conjunction with the segment targeting system 126. In this example, a user of the graphical user interface 600 is creating the user input 508 by selecting traits 502 that the user believes correspond to a target audience of 'angry cat lovers'. The user has selected the "cats contextual trait" 602 and the "anger management contextual trait" 604. Further, the user has input desired propensity scores 606 and 608, respectively, for each of these traits, illustrated as a propensity score of 90 on a scale of 100 for the cats propensity score 606 corresponding to the cats contextual trait 602, and a propensity score of 60 on a scale of 100 for the anger management propensity score 608 corresponding to the anger management contextual trait 604.

Returning to FIG. 5, an audience identification module 510 of the segment targeting system 126 receives the user input 508 and additionally receives the user interest scores 416, such as from the user interest scoring system 122. The audience identification module 510 processes the user interest scores 416 to identify particular users that have normalized interest scores for categories that meet or exceed propensity scores for corresponding traits identified by the user input 508. The audience identification module 510 may search all users for which the user interest scores 416 exist, may search users until a threshold number of users have been identified, and so forth, and outputs the located users as identified users 512.

Figure 7:
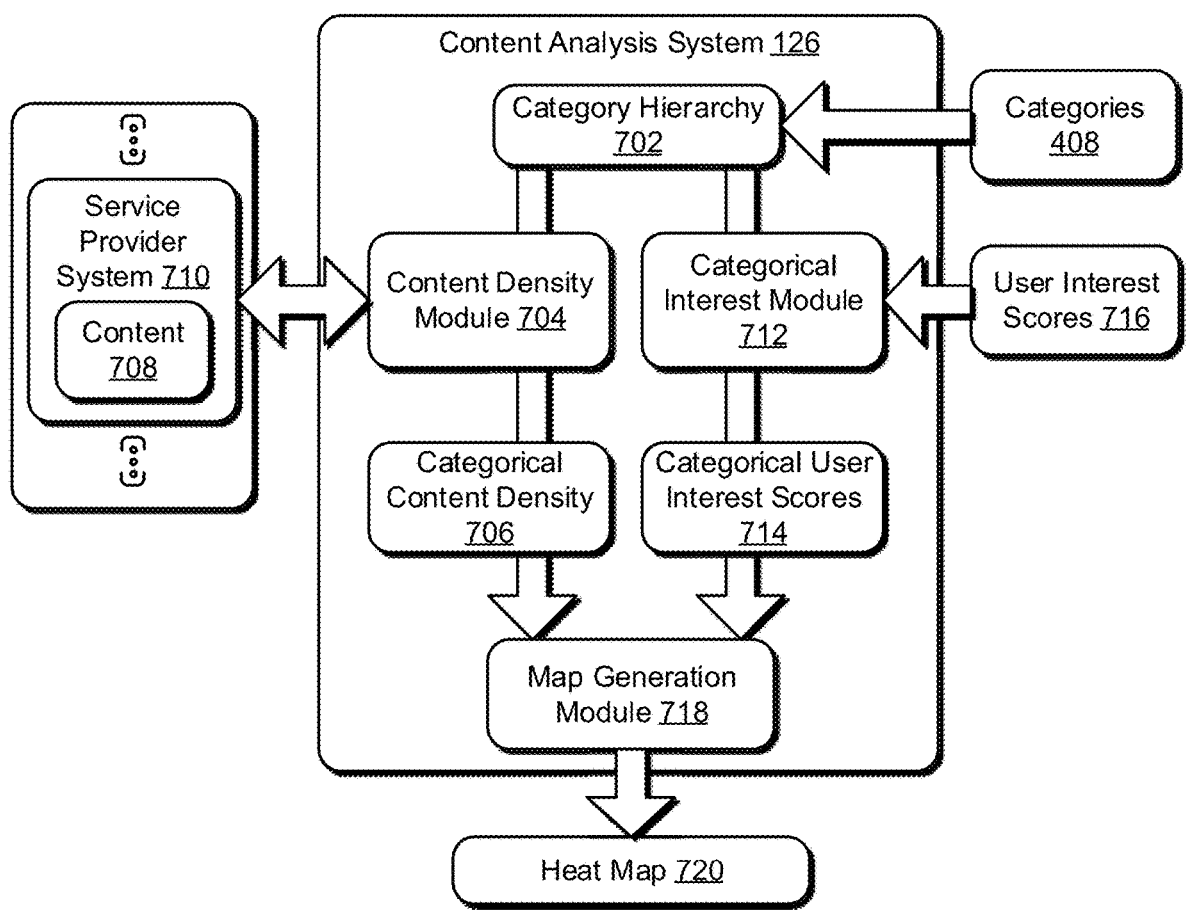
FIG. 7 depicts a system in an example implementation showing operation of an example content analysis system for identification of categorical content density and categorical user interest scores.
Figure 8:
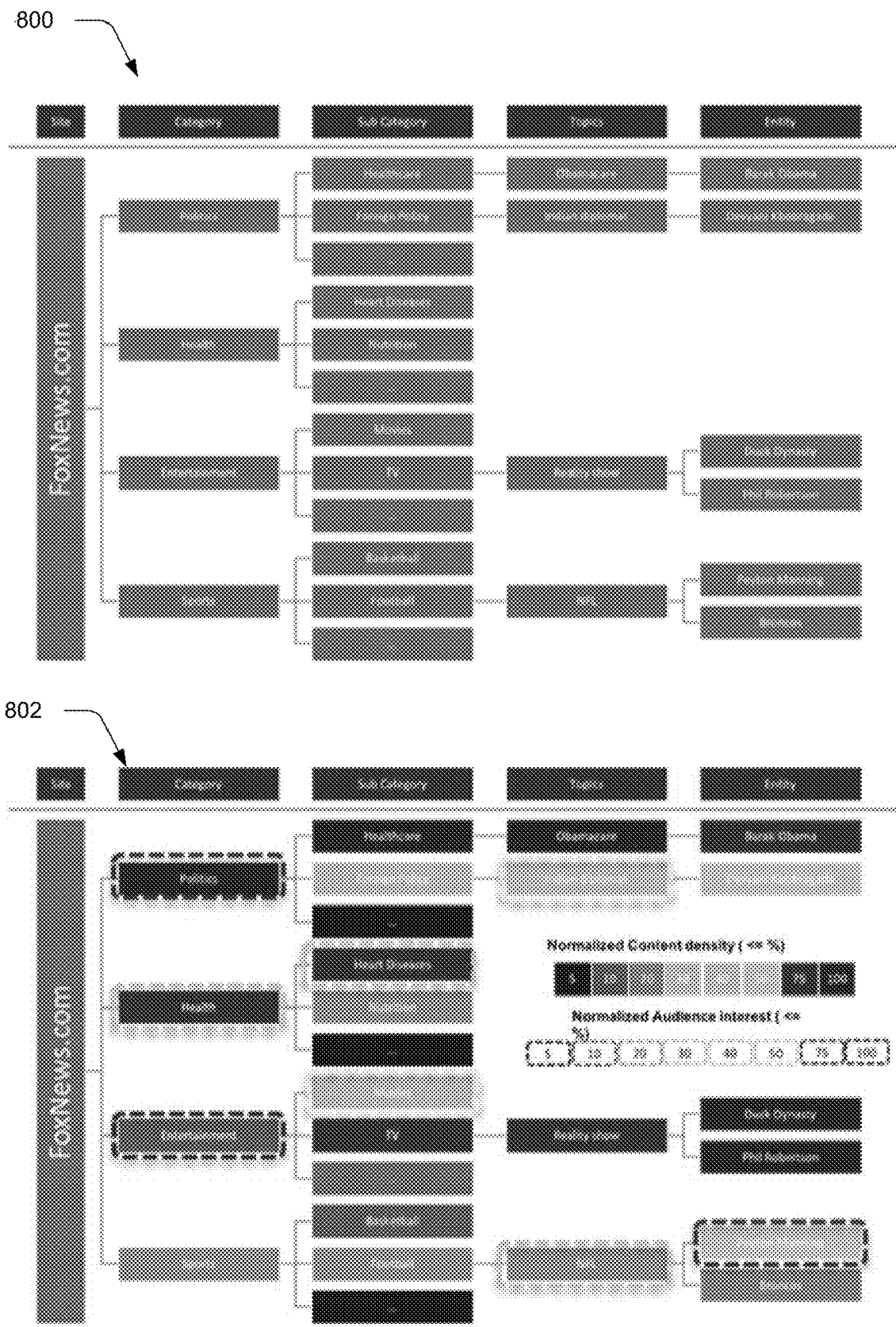
FIG. 8 depicts example graphical user interfaces portraying an example category hierarchy and an example heat map used in conjunction with a content analysis system.

FIG. 7 depicts a system 700 showing an example content analysis processing pipeline of the content analysis system 128 of FIG. 1 in greater detail to identify categorical content density and categorical user interest scores. The content analysis processing pipeline begins by receiving the categories 408, such as from the user interest scoring system 122, and creating a category hierarchy 702. FIG. 8 displays a portion of an example category hierarchy 800. For instance, the example category hierarchy 800 is a hierarchical map that includes a category of "politics", which contains a sub-category "healthcare", which in turn contains a topic of "Obamacare" which in turn contains an entity of "Barak Obama".

Returning to FIG. 7, a content density module 704 of the content analysis system 128 utilizes the category hierarchy 702 to determine categorical content densities 706 for content 708 associated with a particular service provider system 710. The content 708 is processed, for instance, by the content contextualization system 120 of FIG. 3 to determine weighted entities 334 for the content 708. The weighted entities 334 for the content 708 are applied to the category hierarchy 702 to generate a content density weight specific to the particular service provider system 710 for each item within the category hierarchy 702. As an example, for the example category hierarchy 800, a content density weight is generated for each of the items "politics", "healthcare", "Obamacare", and "Barak Obama". The categorical content densities 706 include the sums of these content density weights for each item of the category hierarchy 702.

The categorical content densities 706 are normalized for each level of the category hierarchy 702. For instance, for the example category hierarchy 800 the categorical content densities are normalized separately for each of the levels "category", "sub category", "topics", and "entity". To do so, the content density module 704 may determine a number 'D' of unique URLs across all categories for the particular service provider system 710. For each particular category of the category hierarchy 702, the content density module 704 determines a number of URLs associated with the category and divides by the number D to determine the category's content density. This process is repeated for each level of the category hierarchy 702, for instance for the sub categories, the topics, and the entities, thus separately normalizing each level.

Further, a categorical interest module 712 utilizes the category hierarchy 702 to determine categorical user interest scores 714 for users associated with the particular service provider system 710. For each user associated with the particular service provider system 710, a user interest score 716 is generated. For instance, the user interest scores 716 may be generated by the user interest scoring system 122 as described with respect to FIG. 4. The user interest scores 716 for the particular service provider system 710 are applied to the category hierarchy 702 to generate an aggregate user interest weight for each item within the category hierarchy 702. For instance, with respect to the example category hierarchy 800 of FIG. 8, a user interest weight is generated for each of the items "politics", "healthcare", "Obamacare", and "Barak Obama". The categorical user interest scores 714 include the sums of the user interest weights for each item of the category hierarchy 702.

The categorical user interest scores 714 are normalized for each level of the category hierarchy 702. For instance, for the example category hierarchy 800 the categorical user interest scores are normalized separately for each of the levels "category", "sub category", "topics", and "entity". To do so, the categorical interest module 712 may determine a sum 'I' of all interest scores across all URLs and all categories. For each particular category of the category hierarchy 702, the categorical interest module 712 determines the sum of user interest scores associated with the category and divides by the number I to determine the category's user interest. This process is repeated for each level of the category hierarchy 702, for instance for the sub categories, the topics, and the entities, thus separately normalizing each level.

A map generation module 718 utilizes the categorical content density 706 and the categorical user interest scores 714 to generate a heat map 720 portraying the normalized content density and the normalized audience interest for each item of the category hierarchy 702. The normalized scores are separately applied to a visual representation of the category hierarchy 702 to create the heat map 720. Further, a user may specify a rollup window for use by the map generation module 718, e.g., a time period after which the results are reset such as to show trending interest on a daily basis, a weekly basis, a yearly basis, and so forth.

An example graphical user interface 802 of FIG. 8 depicts an example heat map showing categorical content densities and categorical user interest scores as applied to the example category hierarchy 800. For each item in the example category hierarchy 800, the item is colored according to the normalized content density of the item and surrounded by a colored outline according to the normalized audience interest of the item. In this example, the entity "Peyton Manning" is colored to indicate a medium content density for Peyton Manning within content of the particular service provider system 710, but surrounded with a colored outline indicating a high audience interest for Peyton Manning among users of the particular service provider system 710. A curator of the particular service provider system 710 may utilize this heat map, for instance, to identify that a higher amount of content should be created or displayed that includes the entity Peyton Manning Example Procedures The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

Figure 9:
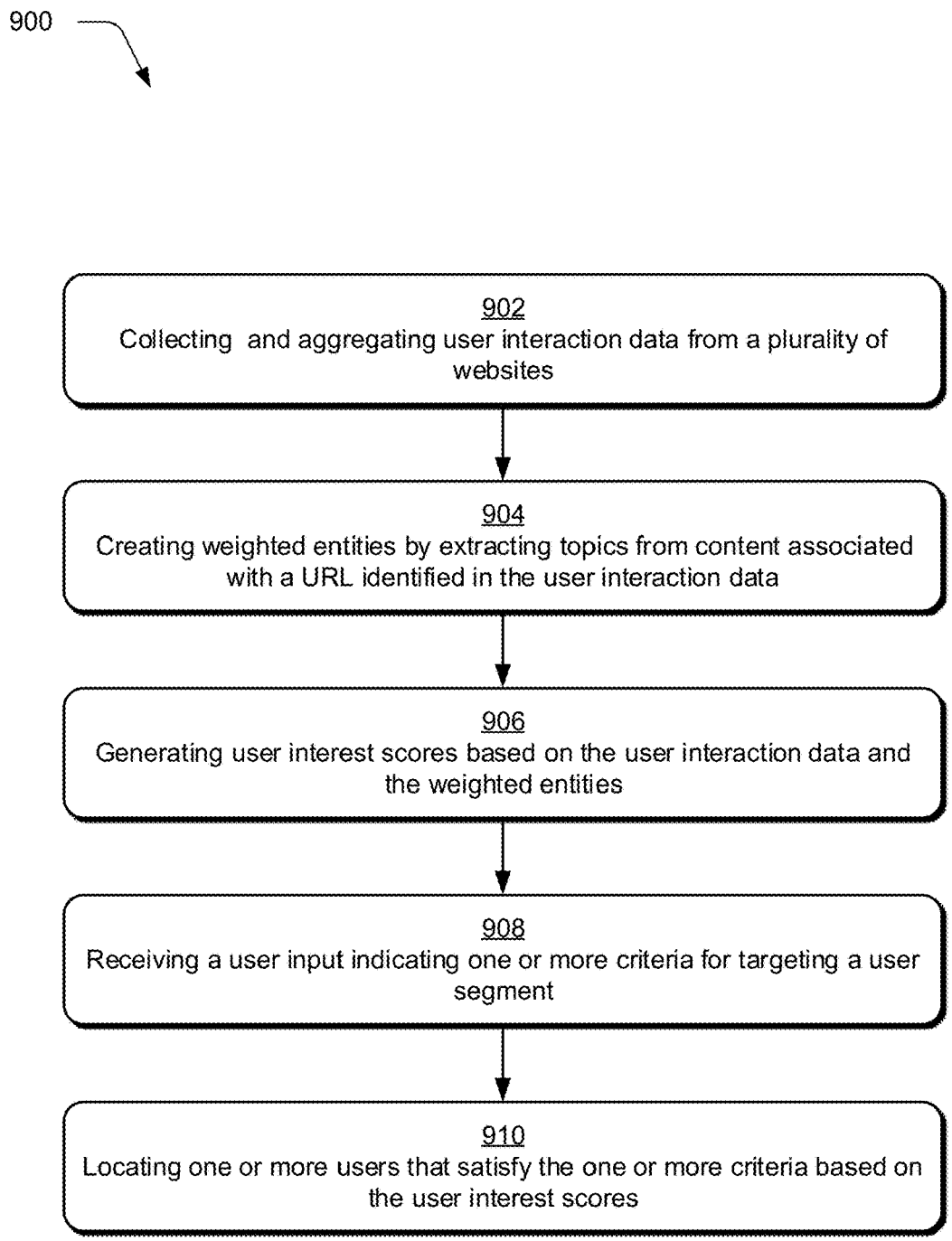
FIG. 9 is a flow diagram depicting a procedure in an example implementation in which user interest scores are generated and utilized as part of a contextual user interest technique to locate users by a segment targeting system.

FIG. 9 depicts a procedure 900 in an example implementation in which user interest scores are generated and utilized as part of a contextual user interest technique to locate users by a segment targeting system. User interaction data is collected and aggregated from a plurality of websites (block 902). Every time a website gets traffic from a user, the website generates event data including a referring URL indicating where the user came from before visiting the website. A plurality of websites collect this event data for any number of users as user interaction data and communicate the user interaction data to a contextual user interest system. The contextual user interest system aggregates the user interaction data from the plurality of websites, which may include sanitizing the referrer URLs included in the user interaction data. By aggregating the user interaction data from multiple websites, the contextual information that may be extracted from the user interaction data is greater than what would be available to any single website by itself. This may be performed, for instance, by the data collection system 118 and/or the service manager module 116 as described in greater detail with respect to FIG. 2.

Weighted entities are created by extracting topics from content associated with a URL identified in the user interaction data (block 904). The URL identified in the user interaction data is crawled to extract website data associated with the URL. The website data includes text that is then processed with natural language processing techniques to determine what the content associated with the URL is directed to, and to score the content across multiple different topics or entities for importance with respect to the URL. This may include, for instance, creating tokens from the text in the website data, identifying named entities within the text, and identifying a part of speech for the words within the text by a content contextualization system 120 as described in greater detail with respect to FIG. 3.

User interest scores are generated based on the user interaction data and the weighted entities (block 906). This may include, for instance, using the user interaction data to identify that a user visited the URL processed in block 904 and using the weighted entities associated with the URL to assign interest scores to the user. As an example, the URL may include a weighted entity identifying a particular actor. As the user visited the URL, they are assigned an interest score that indicates that the user is interested in the particular actor. However, the user interest score includes a degree of interest beyond merely identifying in a binary manner whether the user is interested in a particular topic. The natural language processing techniques utilized by the content contextualization system of FIG. 3, for instance, assign a propensity score that indicates both a degree and a polarity of the users' interest in a particular topic. As an example, propensity scores may be on a scale of 0 to 1, where a score 0.5 indicates a neutral interest in a topic, a score between 0 and 0.5 indicates a negative interest in a topic, and a score between 0.5 and 1 indicates a positive interest in a topic, with the degree of interest increasing the further the score is from 0.5 to a maximum negative interest at a score of 0 and a maximum positive interest at a score of 1. The propensity scores, for instance, take into account a number of times that a particular user has visited pages associated with a particular topic, so that a user that has viewed a topic 10 times has a propensity score that is greater than a user that has viewed a topic only once and so forth. For each particular user, an interest score is saved for each topic and collectively stored as a user interest score. This may be performed, for instance, by the user interest scoring system 122 as described in greater detail with respect to FIG. 4.

A user input is received indicating one or more criteria for targeting a user segment (block 908). This user input may be received, for instance, from a client device 106 associated with a service provider system 102 that subscribes to a service provided by the contextual user interest system 104. The client device 106 displays a number of traits to a user of the client device 106, and the user defines a segment including one or more of the traits. For each selected trait, the user additionally defines a propensity for the selected trait. As an example, the user may define a segment for "soccer lovers" that includes a "soccer" trait with a propensity of 0.9 and a "sports" trait of 0.7. In this example, by defining the soccer trait to have a higher propensity than a sports trait, the defined segment will apply to users that have a higher interest in soccer than they do in sports overall, thus applying to users that not only have an interest in soccer but have a particularly strong interest in soccer compared to other sports as a whole. Once the segment is defined by the user as including both selected traits and propensities, it is communicated to and received by the contextual user interest system 104 as the user input.

One or more users are located that satisfy the one or more criteria based on the user interest scores (block 910). For instance, the segment targeting system 126 of the contextual user interest system 104 uses the user input from block 908 to search for corresponding users within the user interest scores for block 906. To continue the on-going example, a user input defining a segment with a soccer trait with a propensity of 0.9 and a sports trait of 0.7 is used to search the user interest scores for users with both an interest score of 0.9 or greater for the soccer topic and an interest score of 0.7 or greater for the sports topic. Once users satisfying these criteria are located, the list of identified users may be utilized to target or recommend content to the identified users, such as to guide user interaction and navigation with digital content in a manner consistent with the users' interest scores. The list of identified users may be dynamically updated as websites are contextualized and/or re-contextualized, as user interaction data is expanded, as user interest scores are updated, and so forth. In this way, a user may define a segment once and continue to gain the benefits of an up-to-date list of identified users over time.

Figure 10:
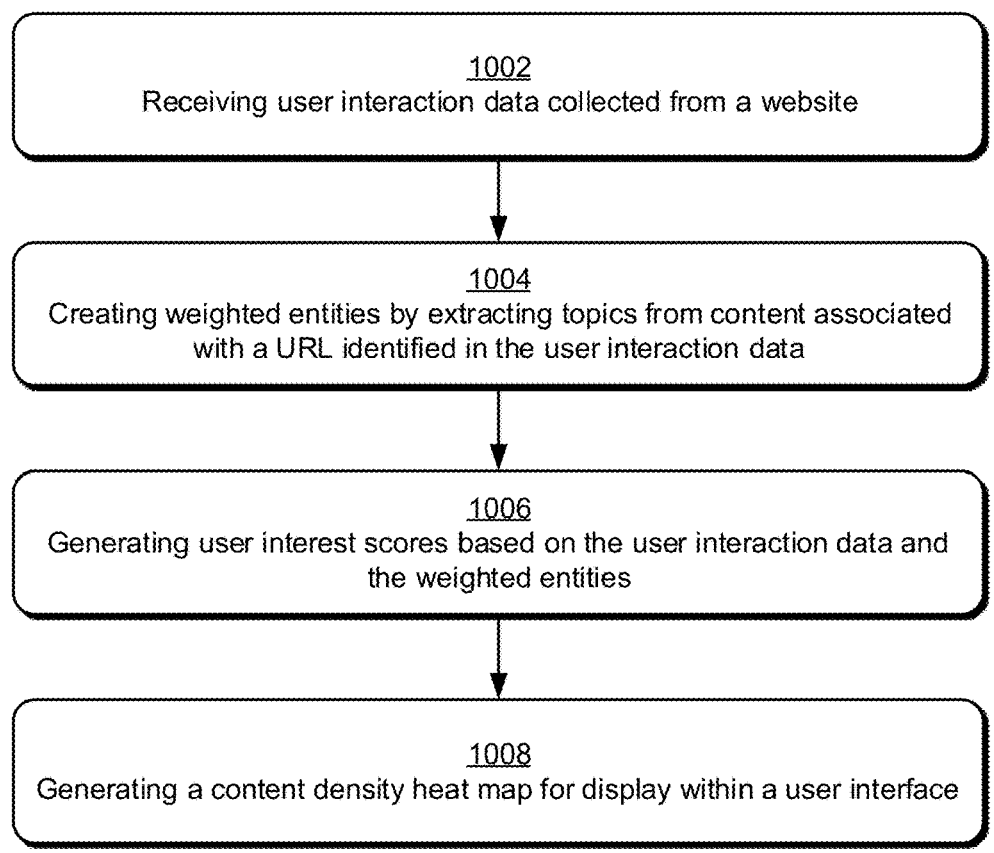
FIG. 10 is a flow diagram depicting a procedure in an example implementation in which user interest scores are generated and utilized as part of a contextual user interest technique to analyze content with a content analysis system.

FIG. 10 depicts a procedure 1000 in an example implementation in which user interest scores are generated and utilized as part of a contextual user interest technique to analyze content with a content analysis system. User interaction data is received that has been collected from a website (block 1002). Every time the website gets traffic from a user, the website generates event data including a referring URL indicating where the user came from before visiting the website. The website collects this event data for any number of users as user interaction data and communicates the user interaction data to a contextual user interest system. This may be performed, for instance, by the data collection system 118 and/or the service manager module 116 as described in greater detail with respect to FIG. 2 and block 902 of FIG. 9.

Weighted entities are created by extracting topics from content associated with a URL identified in the user interaction data (block 1004). The URL identified in the user interaction data is crawled to extract website data associated with the URL. The website data includes text that is then processed with natural language processing techniques to determine what the content associated with the URL is directed to, and to score the content across multiple different topics or entities for importance with respect to the URL as described in greater detail with respect to FIG. 3 and block 904 of FIG. 9.

User interest scores are generated based on the user interaction data and the weighted entities (block 1006). This may include, for instance, using the user interaction data to identify that a user visited the URL processed in block 904 and using the weighted entities associated with the URL to assign interest scores to the user. The natural language processing techniques utilized by the content contextualization system of FIG. 3, for instance, may assign a propensity score that indicates both a degree and a polarity of the users' interest in a particular topic. For each particular user, an interest score is saved for each topic and collectively stored as a user interest score. This may be performed, for instance, by the user interest scoring system 122 as described in greater detail with respect to FIG. 4 and block 906 of FIG. 9.

A content density heat map is generated for display within a user interface (block 1008). The content density heat map overlays user interests versus content density for a particular content provider, such as for a particular web domain. For each item of content (e.g., category, topic, subject, entity, etc.) it is determined how much content of the particular content provider corresponds to the item of content as well as how much the user base of the particular content provider is interested in the item of content. This may be performed, for instance, by the content analysis system 128 as described in greater detail with respect to FIG. 7. The content density heat map can be used, for instance, to track dynamic content and determine if content of the dynamic content matches what users are interested in. As an example, a news website may provide news pertaining to politics, sports, and music. The content density heat map conveys a content density for each of the topics of politics, sports, and music, and also conveys an aggregate user interest of users of the news website with respect to each of the topics of politics, sports, and music. The curators of the news website may use the content density heat map to identify that the website has a highest density of articles that pertain to politics, while the user base has a highest interest in articles that pertain to sports. At this point, the curators of the news website may reorganize the website to emphasize sports articles over political articles, direct journalists to increase the number of articles written about sports, and so forth. In this way, the content density heat map is useful to help align the content of a website with the interests of a user base of the website.

Example System and Device

Figure 11:
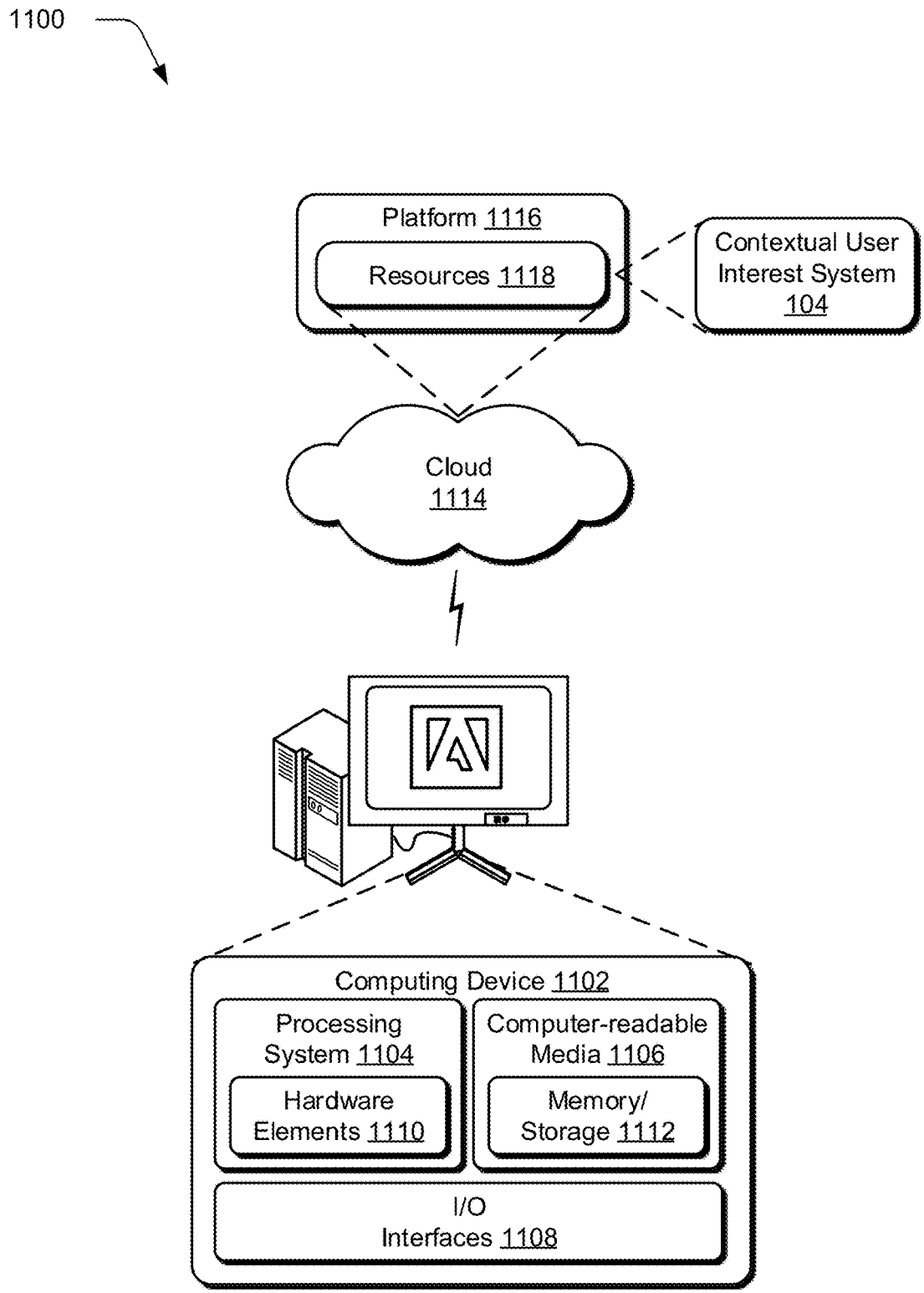
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the contextual user interest system 104. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. In a digital medium environment, a method implemented by at least one computing device, the method comprising:
    retrieving, by the at least one computing device, content from a webpage associated with a URL identified within interaction data collected from a website;

creating, by the at least one computing device, weighted entities based on the content;

generating, by the at least one computing device, interest scores by identifying a profile in the interaction data that is associated with the URL and assigning the interest scores to the profile based on the weighted entities; and generating, by the at least one computing device, a content density heat map for display within a user interface, the generating including for a particular domain:

creating a hierarchical map having a plurality of categories;

determining content density for the plurality of categories based on the weighted entities created from content of URLs associated with the particular web domain;

determining audience interest for the plurality of categories based on portions of the interest scores corresponding to the particular web domain; and altering the hierarchical map to show, for the plurality of categories, an indication of the content density and an indication of the audience interest.

2. The method of claim 1, wherein the URL is a referrer URL associated with a different website and the webpage is part of the different website.

3. The method of claim 1, wherein the interaction data includes a plurality of sanitized URLs.

4. The method of claim 1, wherein the creating the weighted entities includes extracting topics from the content and creating tokens based on text included in the content and weighting the tokens based on an inverse document frequency.

5. The method of claim 4, wherein the creating the tokens includes one or more of decompounding a word of the text, removing a stop-word from the text, or stemming a word of the text.

6. The method of claim 4, wherein weighting of the weighted entities is based on one or more of recognition of a named entity within the text or recognition of a part of speech of a word of the text.

7. The method of claim 1, wherein the generating the interest scores includes, for a user identified by the interaction data, identifying URLs visited by the user and summing the weights of weighted entities associated with the identified URLs.

8. The method of claim 7, wherein the generating the interest scores further includes normalizing the summed weights with a propensity function.

9. The method of claim 1, wherein the content density and the audience interest is normalized separately for each level of a plurality of levels within the hierarchical map.

10. In a digital medium environment, a system comprising:

an interest scoring system implemented at least partially in the hardware of the at least one computing device to:

retrieve content from a webpage associated with at least one uniform resource locator (URL) identified within interaction data collected from a website;

create weighted entities based on the content; and generate interest scores by identifying a profile in the interaction data that is associated with the at least one URL and assign the interest scores to the profile based on the weighted entries; and a content analysis system to generate a content density heat map for display within a user interface for a particular domain, the content analysis system implemented at least partially in hardware of the at least one computing device to:

create a hierarchical map having a plurality of categories;

determine content density for the plurality of categories based on the weighted entities created from content of URLs associated with the particular web domain;

determine audience interest for the plurality of categories based on portions of the interest scores corresponding to the particular web domain; and alter the hierarchical map to show, for the plurality of categories, an indication of the content density and an indication of the audience interest.

11. The system of claim 10, wherein the URL is a referrer URL associated with a different website and the webpage is part of the different website.

12. The system of claim 10, wherein the interaction data includes a plurality of sanitized URLs.

13. The system of claim 10, wherein the weighted entities are defined using a plurality of topics and further comprising extracting the plurality of topics from the webpage by creating tokens based on text included in the webpage and weighting the tokens based on an inverse document frequency.

14. The system of claim 13, wherein the creating the tokens includes one or more of decompounding a word of the text, removing a stop-word from the text, or stemming a word of the text.

15. The system of claim 13, further comprising weighting the tokens based on one or more of recognition of a named entity within the text or recognition of a part of speech of a word of the text.

16. In a digital medium environment, a computing device comprising:

a processing system; and a computer-readable storage medium having instructions stored thereon that, responsive to execution by the processing system, causes the processing system to perform operations including:

retrieving content from a webpage associated with a URL identified within interaction data collected from a website;

creating weighted entities based on the content;

generating interest scores by identifying a profile in the interaction data that is associated with the URL and assigning the interest scores to the profile based on the weighted entities; and generating a content density heat map for display within a user interface, the generating including for a particular domain:

creating a hierarchical map having a plurality of categories;

determining content density for the plurality of categories based on the weighted entities created from content of URLs associated with the particular web domain;

determining audience interest for the plurality of categories based on portions of the interest scores corresponding to the particular web domain; and altering the hierarchical map to show, for the plurality of categories, an indication of the content density and an indication of the audience interest.

17. The computing device of claim 16, wherein the URL is a referrer URL associated with a different website and the webpage is part of the different website.

18. The computing device of claim 16, wherein the interaction data includes a plurality of sanitized URLs.

19. The computing device of claim 16, wherein the creating the weighted entities includes extracting topics from the content and creating tokens based on text included in the content and weighting the tokens based on an inverse document frequency.

20. The computing device of claim 19, wherein the creating the tokens includes one or more of decompounding a word of the text, removing a stop-word from the text, or stemming a word of the text.

* * * * *